United States Patent [19]
Kojima et al.

[11] Patent Number: 5,214,961
[45] Date of Patent: Jun. 1, 1993

[54] PRESSURE SENSOR

[75] Inventors: Takao Kojima; Toshikatsu Yasuda; Katsuyoshi Mizumoto; Kanehisa Kitsukawa, all of Aichi, Japan

[73] Assignee: NGK Spark Plug Co., Ltd., Aichi, Japan

[21] Appl. No.: 744,409

[22] Filed: Aug. 13, 1991

[30] Foreign Application Priority Data

Aug. 28, 1990 [JP] Japan .................. 2-224187

[51] Int. Cl.$^5$ .................................. G01L 7/08
[52] U.S. Cl. ............................. 73/715; 73/721; 73/727; 73/756; 92/103 SD; 338/4; 361/283
[58] Field of Search ............... 73/727, 721, 720, 726, 73/756, 862.63, 708, 730; 338/4; 29/25.35, 25.41, 25.42, 621.1; 361/283; 92/103 R, 103 SD

[56] References Cited

U.S. PATENT DOCUMENTS 4,864,271 9/1989 Yajima .......................... 338/4
4,894,635 1/1990 Yajima et al. ................. 338/4

FOREIGN PATENT DOCUMENTS 57-4531 1/1982 Japan .
63-292032 11/1988 Japan .

OTHER PUBLICATIONS

SAE Report 860474, "High Pressure Thick Film Monolithic Sensors", by Roberto Dell 'Acqua, and Giuseppe Dell'Orto of Marelli Autronica S.p.A. Pravia(Italy), pp. 79-87.

*Primary Examiner*—Donald O. Woodiel
*Attorney, Agent, or Firm*—Finnegan, Henderson, Farabow, Garrett & Dunner

[57] ABSTRACT

A pressure sensor having a ceramic support, a first ceramic layer attached to a peripheral portion of one side of the ceramic support, and a second ceramic layer which is attached to a peripheral portion of another side of the ceramic support such that the pressure sensor is shaped as an integral assembly. The ratio of the thickness of the first ceramic layer to that of the second ceramic layer is in the range of 1:10 to 1:1. The ratio of the thicknesses of the first and second ceramic layers to thickness of the ceramic support is no more than 1:2. The pressure sensor further includes a hollow space formed between the ceramic support and at least one of the first and second ceramic layers so that, after shaping as an integral assembly, the ceramic layer or layers will work as a diaphragm that is capable of deformation under pressure.

14 Claims, 4 Drawing Sheets

THICK FILM SIDE

WARPAGE

FIG. 5a

TEST RESULTS 1

| SAMPLE NO. | THICK CERAMIC FILMS (2) AND (3) ||||||| CERAMIC SUPPORT (1) |||| THICKNESS RATIO OF (2) TO (1) | INSERT (THICKNESS IN μm) | WARPAGE |
|---|---|---|---|---|---|---|---|---|---|---|---|---|---|---|
| | MATERIAL | FACTOR OF SHRINKAGE, % | DETECTION SIDE (2) || NONDETECTION SIDE (3) || RELATIVE THICKNESS RATIO OF (3) AND (2) | MATERIAL | THICKNESS, μm | FACTOR OF SHRINKAGE, % | | | |
| | | | THICKNESS, μm | | THICKNESS, μm | | | | | | | | | |
| 1 | Al₂O₃ | 17.0 | 50 | | 20 (PRINTED) | | 0.4 | Al₂O₃ | 820 | 16.7 | 0.06 | ABSENT | ◎ |
| 2 | Al₂O₃ | 17.0 | 50 | | 100 | | 0.5 | Al₂O₃ | 820 | 16.7 | 0.06 | ABSENT | ◎ |
| 3 | Al₂O₃ | 17.0 | 50 | | 500 | | 0.1 | Al₂O₃ | 820 | 16.7 | 0.06 | PRESENT (30) | ○ |
| 4 | Al₂O₃ | 17.0 | 100 | | 20 (PRINTED) | | 0.2 | Al₂O₃ | 820 | 16.7 | 0.12 | PRESENT (50) | ◎ |
| 5 | Al₂O₃ | 17.0 | 100 | | 100 | | 1.0 | Al₂O₃ | 820 | 16.7 | 0.12 | PRESENT (50) | ◎ |
| 6 | Al₂O₃ | 17.0 | 100 | | 500 | | 0.2 | Al₂O₃ | 820 | 16.7 | 0.12 | PRESENT (50) | ◎ |
| 7 | Al₂O₃ | 17.0 | 400 | | 100 | | 0.25 | Al₂O₃ | 820 | 16.7 | 0.49 | ABSENT | ○ |
| 8 | Al₂O₃ | 17.0 | 400 | | 200 | | 0.5 | Al₂O₃ | 820 | 16.7 | 0.49 | ABSENT | ○ |
| 9 | Al₂O₃ | 17.0 | 400 | | 500 | | 0.8 | Al₂O₃ | 820 | 16.7 | 0.49 | ABSENT | ◎ |
| 10 | Al₂O₃ | 16.2 | 50 | | 20 (PRINTED) | | 0.4 | Al₂O₃ | 800 | 17.4 | 0.07 | PRESENT (30) | ◎ |
| 11 | Al₂O₃ | 16.2 | 50 | | 20 (PRINTED) | | 0.4 | Al₂O₃ | 800 | 17.4 | 0.07 | ABSENT | ◎ |
| 12 | Al₂O₃ | 16.2 | 50 | | 100 | | 0.5 | Al₂O₃ | 800 | 17.4 | 0.07 | PRESENT (30) | ◎ |
| 13 | Al₂O₃ | 16.2 | 50 | | 500 | | 0.1 | Al₂O₃ | 800 | 17.4 | 0.07 | ABSENT | △ |
| 14 | Al₂O₃ | 16.2 | 100 | | 20 (PRINTED) | | 0.2 | Al₂O₃ | 800 | 17.4 | 0.13 | ABSENT | ○ |
| 15 | Al₂O₃ | 16.2 | 100 | | 100 | | 1.0 | Al₂O₃ | 800 | 17.4 | 0.13 | PRESENT (50) | ◎ |
| 16 | Al₂O₃ | 16.2 | 100 | | 500 | | 0.2 | Al₂O₃ | 800 | 17.4 | 0.13 | PRESENT (50) | ○ |
| 17 | Al₂O₃ | 16.2 | 400 | | 100 | | 0.25 | Al₂O₃ | 800 | 17.4 | 0.5 | PRESENT (50) | △ |
| 18 | Al₂O₃ | 16.2 | 100 | | 20 (PRINTED) | | 0.2 | Al₂O₃ | 590 | 16.7 | 0.17 | ABSENT | ◎ |
| 19 | Al₂O₃ | 16.2 | 100 | | 100 | | 1.0 | Al₂O₃ | 590 | 16.7 | 0.17 | PRESENT (50) | ◎ |
| 20 | Al₂O₃ | 16.2 | 200 | | 100 | | 0.5 | Al₂O₃ | 590 | 16.7 | 0.34 | ABSENT | ◎ |

FIG. 5b

| SAMPLE NO. | THICK CERAMIC FILMS (2) AND (3) | | | | | CERAMIC SUPPORT (1) | | | | INSERT (THICKNESS IN μm) | WARPAGE |
|---|---|---|---|---|---|---|---|---|---|---|---|
| | MATERIAL | FACTOR OF SHRINKAGE, % | DETECTION SIDE (2) THICKNESS, μm | NONDETECTION SIDE (3) THICKNESS, μm | RELATIVE THICKNESS RATIO OF (3) AND (2) | MATERIAL | THICKNESS, μm | FACTOR OF SHRINKAGE, % | THICKNESS RATIO OF (2) TO (1) | | |
| 21 | Al₂O₃ | 16.2 | 200 | 100 | 0.5 | Al₂O₃ | 1500 | 16.7 | 0.13 | PRESENT (50) | ◎ |
| 22 | Al₂O₃ | 16.2 | 200 | 500 | 0.4 | Al₂O₃ | 1500 | 16.7 | 0.13 | PRESENT (50) | ◎ |
| 23 | Al₂O₃ | 16.2 | 400 | 100 | 0.25 | Al₂O₃ | 1500 | 16.7 | 0.27 | ABSENT | ○ |
| 24 | Al₂O₃ | 16.2 | 400 | 200 | 0.5 | Al₂O₃ | 1500 | 16.7 | 0.27 | ABSENT | ◎ |
| 25 | Al₂O₃ | 16.2 | 400 | 500 | 0.8 | Al₂O₃ | 1500 | 16.7 | 0.27 | ABSENT | ◎ |
| 26 | Al₂O₃ | 17.0 | 100 | 20 (PRINTED) | 0.2 | Al₂O₃ | 800 | 16.2 | 0.13 | PRESENT (50) | ○ |
| 27 | Al₂O₃ | 17.0 | 100 | 100 | 1.0 | Al₂O₃ | 800 | 16.2 | 0.13 | PRESENT (100) | ○ |
| *28 | Al₂O₃ | 17.0 | 100 | 100 | 1.0 | Al₂O₃ | 800 | 16.2 | 0.13 | PRESENT (200) | △ |
| *29 | Al₂O₃ | 16.2 | 400 | 20 (PRINTED) | 0.05 | Al₂O₃ | 800 | 17.4 | 0.5 | ABSENT | × |
| *30 | Al₂O₃ | 17.0 | 400 | 100 | 0.25 | Al₂O₃ | 590 | 16.7 | 0.68 | ABSENT | × |
| 31 | ZrO₂+Y₂O₃ | 19.3 | 100 | 100 | 1.0 | Al₂O₃ | 590 | 16.7 | 0.13 | ABSENT | ○ |
| 32 | ZrO₂+Y₂O₃ | 20.0 | 100 | 100 | 1.0 | Al₂O₃ | 590 | 16.7 | 0.13 | ABSENT | △[1] |
| *I | Al₂O₃ | 17.4 | 100 | — | — | Al₂O₃ | 590 | 16.7 | 0.13 | ABSENT | × |
| **II | Al₂O₃ | 17.0 | 200 | — | — | Al₂O₃ | 590 | 16.7 | 0.34 | PRESENT (50) | × |

NOTE: SAMPLES WITH AN ASTERISK WERE OUTSIDE THE SCOPE OF THE CLAIMS OF THE PRESENT INVENTION; SAMPLES I AND II HAD A THICK CERAMIC FILM PROVIDED ONLY ON THE DETECTION SIDE (SURFACE) OF THE CERAMIC SUPPORT.

1): INTERRUPTIONS OCCURRED.

FIG. 6
TEST RESULTS 2

| SAMPLE NO. | ELECTRODE PATTERN | | WARPAGE | REMARKS |
|---|---|---|---|---|
| | FIG. 3a | FIGS. 3b AND 3c | | |
| 4 | ○ | | ◎ | |
| 5 | | ○ | ◎ | |
| 5 | ○ | | ◎ | |
| 6 | | ○ | ○ | SLIGHTLY GREATER WARPAGE THAN IN THE ABSENCE OF ELECTRODES |
| 12 | ○ | | ◎ | |
| 15 | | ○ | ◎ | |
| 18 | ○ | | ◎ | |
| 19 | | ○ | ◎ | |
| 21 | ○ | | ◎ | |
| 22 | | ○ | ◎ | |

PRESSURE SENSOR

BACKGROUND OF THE INVENTION

1. Field of the Invention

The present invention relates to sensors of pressure, acceleration, liquid level, and the like for use in the control of automotive engines. More particularly, it concerns such sensors made of ceramic materials.

2. Discussion of the Related Art

SAE Report 860474 discloses a sensor in which a ceramic diaphragm is bonded to a ceramic support using glass. However, this type of sensor suffers from several disadvantages including inadequate strength of the joints between the diaphragm, the glass, and the ceramic support due to a thermal expansion mismatch between the glass and the ceramic materials, and deformation due to the expansion mismatch in the absence of pressure application at elevated temperatures.

In an attempt to solve these problems, Japanese Patent Unexamined Publication Nos. Sho. 57-4531 and Sho. 63-292032, propose a process for fabricating a durable sensor in which a diaphragm and a ceramic support are first assembled in a raw state, in which the ceramic parts are in the form of unsintered green sheets, and then the assembly is sintered. According to this method, the aforementioned problems can be solved to some extent by avoiding the use of glass. However, there is a need to use substantially the same material for both the diaphragm and the ceramic support and to permit them to shrink by the same amount during sintering. To meet these requirements, very cumbersome procedures of quality control have been necessary in the manufacturing process.

When two green sheets are superimposed on each other and sintered, warpage or bends will result in the sintered assembly unless the two sheets shrink equally during sintering. If a warped sintered assembly is to be used as a pressure sensor for emissions from automobiles, leakage of the exhaust gas can occur, or if vibrating emissions are introduced, a resonance results and makes it difficult, if not impossible, to attain accurate pressure detection.

In order to avoid these problems, the diaphragm and the support used in the pressure sensor must be made of materials that will experience the smallest possible amount of warpage. However, even if the green sheets assembled as a laminate are made of the same material, the amount of shrinkage during sintering will differ from one lot of manufacture to another on account of process variations in sheet fabrication and temperature differences that occur upon calcination, for example. These factors may cause an unavoidable difference in shrinkage of about ±0.4%.

If a thick-film process, such as printing, is used, not only does a large difference in shrinkage occur between a sheet and a printed pattern during sintering, but also, the occurrence of warpage remains due to formation of metallic parts for electrodes and leads by printing.

SUMMARY OF THE INVENTION

The present invention has been made in view of the above circumstances and has as an object to provide a pressure sensor that is stable and substantially free from warpage and other defects even if it is produced under such conditions that its components will shrink by different degrees during sintering.

To achieve the objects and in accordance with the purpose of the invention, as embodied and broadly described herein, the pressure sensor of this invention comprises a ceramic support, a first ceramic layer attached to a peripheral portion of one side of the ceramic support, and a second ceramic layer attached to a peripheral portion of another side of the ceramic support such that the pressure sensor is shaped as an integral assembly.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 5a and 5b show a first table of results obtained through experimentation; and FIGS. 6 shows a second table of results obtained through experimentation.

DETAILED DESCRIPTION OF THE PREFERRED EMBODIMENTS

Figure 1:
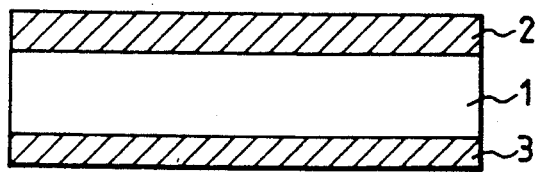
FIG. 1 is a longitudinal sectional view of a pressure sensing device according to an embodiment of the present invention which has no insert provided and which is in a yet to be sintered state.

According to the present invention, a pressure sensor is formed by the provision of a thick ceramic layer, or film, on both sides of a support, so any difference in shrinkage that may occur between the support and each of the thick layers during sintering is sufficiently balanced to avoid the development of undesirable deformations in the pressure sensor.

The thick layers may be such that at least 95% of each layer is made of the same material as the support. The thickness of the layer on one side of the support to that on the other side is preferably in the range of 1:10 to 1:1, more preferably 1:5 to 1:1.

If a large difference in the degree of shrinkage occurs in the support and each of the thick layers, the difference may be cancelled to some extent by holding the support between the two thick layers. Nevertheless, a slight amount of warpage will develop. Thus, in order to insure that the shrinkage of either thick layer can be absorbed as much as possible by the support, the ratio of the thicknesses of each layer to that of the support is preferably 1:2 or smaller, and more preferably 2:5 or smaller.

If a hollow space is to be formed between the support and at least one of the thick layers in order to provide a diaphragm that is capable of deformation under pressure to work as a pressure sensing element, the hollow space may be preliminarily formed in a raw state (i.e., in a green sheet). However, during sintering, the thick layer material may soften or deform, thereby making it difficult to maintain the desired gap. Under theses circumstances, an insert is preferably used which is made of a material that will sublime at temperatures in the range from 200° C. below the softening point of the thick layers up to 100° C. If the temperature at which the insert sublimes is excessively high, it will not only soften but will also be sintered to yield residual carbon. If the temperature at which the insert sublimes is undesirably low, it will soften to deform. The thickness of the insert should not be greater than that of each thick layer, preferably not more than two thirds of the its thickness. Restricting the thickness of the insert in this manner prevents the occurrence of interruptions in the border between the insert and the thick layer to be superposed on the support, and further prevents the development of warpage that may occur should the insert cause adverse effects on the shrinkage of the thick layer during sintering.

The occurrence of interruptions in the border between the insert and the thick layer is also likely if the thick layer is to be formed on the support by printing. To avoid this problem, the thick layer on which the insert is to be provided is preferably made of a green sheet. If the thick layer on the other side of the support is not to be used as a diaphragm, there is no need to provide an insert and, hence, the layer may be formed by a thick-layer process such as printing. In this case, the shrinkage that will occur in the thick layer during sintering must be no more than 1% of the shrinkage that occurs on the surface of the support onto which the thick layer is to be printed.

Even if the above-described requirements are met, the occurrence of warpage is unavoidable if the difference in shrinkage that develops in each of the thick layers and the support during sintering exceeds 4%. To deal with this problem, the difference in shrinkage is preferably no more than 2.5%.

As long as these conditions are satisfied, the support may be made of a different material than the materials used to form the thick layers. For instance, instead of using $Al_2O_3$ for both the support and the thick layers (diaphragms), the support may be made of $Al_2O_3$ whereas the thick layers are made of materials having a smaller Young's modulus, such as $ZrO_2$. Other combinations of materials may be used.

The pressure sensor of the present invention is typically manufactured by the following sequence of steps:

1. A commercial product of $\alpha$-$Al_2O_3$ (99% pure) is wet ground in a mullet ball mill until particles with a size of 2.5 $\mu$m and less account for 80% or more of the powder;

2. After drying the powder, an organic binder and a solvent are added, and after degreasing, the mixture is cast by doctor blading;

3. To control the degree of shrinkage that occurs during sintering, a mixture is prepared either by changing the grinding time or by repeating step 1 except that it is thereafter calcined to reduce the contents of the binder, and either one of these mixtures is cast. A paste that contains Pt as a major component and which also contains an organic binder and 10% of the powder prepared in step 1 is screen-printed to form a predetermined electrode pattern in a thickness of 20 $\mu$m;

4. If necessary, a mixture of carbon black and a solvent is printed in a predetermined thickness to form an insert;

5. The individual elements are superposed one on another and compressed together to form an integral assembly; and 6. After removing the resin, the assembly is sintered at 1520° C. for 2 hours.

By implementing this process, a pressure sensor of the type shown in FIG. 1 or 2 is produced as appropriate.

FIG. 1 is a longitudinal sectional view of a pressure sensor according to an embodiment of the present invention which does not contain an insert and which is not yet sintered. A support 1 is held between thick layers 2 and 3.

Figure 2A:
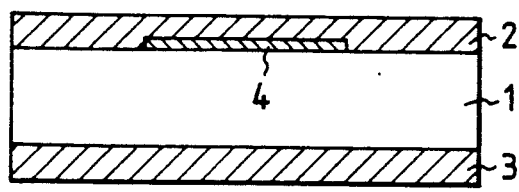
FIGS. 2a and 2b both show a longitudinal sectional view of a pressure sensing device according to another embodiment of the present invention which has an insert or inserts provided and which is in a yet to be sintered state.
Figure 2B:
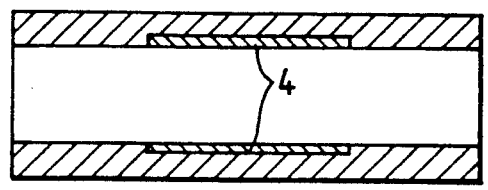

FIG. 2 is a longitudinal sectional view of a pressure sensor according to another embodiment of the present invention in which an insert 4, as formed in step 4, is provided either between the top surface of the support 1 and the bottom surface of the thick layer 2 (FIG. 2A) or between the support 1 and each of the thick layers 2 and 3 (FIG. 2B). As in FIG. 1, the pressure sensor shown in FIG. 2 is not yet sintered. Upon sintering, the insert 4 sublimes to form a predetermined gap between the support 1 and either the thick layer 2 or each of the thick layers 2 and 3.

For testing the effectiveness of the present invention, 32 test samples were fabricated under the conditions set forth in the table shown in FIGS. 5a and 5b. Ten samples that performed satisfactorily (see the table of Test Results 1 as shown in FIGS. 5a and 5b) were further tested, with electrodes being printed in the patterns shown in FIG. 3. The obtained Test Results 2 are shown in the table shown in FIG. 6.

Several test samples were modified in the following manner:

(i) The thick layer on the non-detection side (with the designation "printed" in the table of Test Results 1) was formed in a thickness of 20 $\mu$m by printing an ink composition containing the solvent used in step 2;

(ii) Instead of commercial $Al_2O_3$, a mixture of commercial $ZrO_2$ and 5 mol % $Y_2O_3$ was heat-treated at 1300° C. (No. 31) or 1350° C. (No. 32) and thereafter ground as in step 1.

Figure 3A:
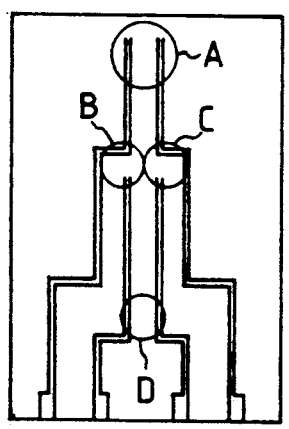
FIGS. 3a, 3b and 3c show the patterns of electrodes to be printed for testing purposes.
Figure 3B:
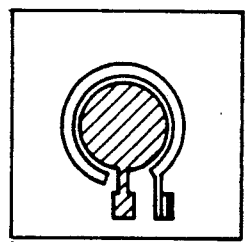
Figure 3C:
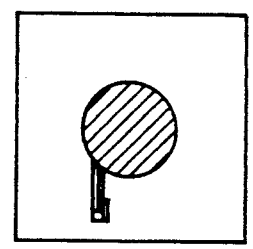

FIGS. 3a, 3b and 3c show the patterns of electrodes printed for testing the performance of samples. Symbols A, B, C and D in FIG. 3a denote resistors which, after being assembled with the other elements, were provided on the thick layer on the detection side by baking or some other suitable method. The completed pressure sensing device was connected to a bridge circuit to measure the pressure of interest.

Figure 4:
FIG. 4 is a longitudinal sectional view showing how warpage develops in a sintered pressure sensor.

FIG. 4 shows how warpage develops in a sintered assembly characterized in the table of Test Results 1 (FIGS. 5a and 5b). Given a sinter width of 2 cm, the amount of warpage was rated by the following criteria in the table: ⊚ (<10 $\mu$m); ◯ (10 to less than 30 $\mu$m); Δ (30 to less than 60 $\mu$m); and x; ($\geq$60 $\mu$m).

As is clear from the tables of Test Results 1 and 2 (FIGS. 5a, 5b, and 6, respectively), the samples of the present invention (Nos. 1–27 and Nos. 31 and 32) which had a thick layer formed not only on the detection side but also on the non-detection side of the ceramic support, with a ratio of the thickness of the layer on the non-detection side to that of the detecting layer being in the range of 1:10 to 1:1 and with the thickness of the detecting layer being no more than one half of the thickness of the support, experienced less warpage than the prior art samples (Nos. I and II) having no thick layer on the non-detection side of the support, comparative sample No. 29, which had a thick layer on the non-detection side but having a thickness much smaller than that of the detecting layer, and comparative sample No. 30, which used a detecting layer thicker than one half the thickness of the support.

In the samples of the present invention, the thickness of the insert was made sufficiently smaller than that of the thick layer on the detection side of the support to prevent the occurrence of interruptions in the border of the insert. Moreover, the use of an insert which was thicker than the detecting layer caused interruptions as in Sample No. 28.

According to the present invention, pressure sensors that are completely free from warpage, interruptions and other defects can be produced even if they are equipped with electrodes.

The pressure sensor of the present invention has been described with particular reference to the type which, when subjected to an external pressure, experiences diaphragm deformation to enable the pressure to be detected in accordance with the amount of the deformation that occurs. The sensor is also applicable to detecting vibrations or acceleration on the basis of diaphragm deformation that is caused by the stress of such vibrations or acceleration. The sensor can also be used as a liquid level detector that uses the distortion of a diaphragm caused by the pressure of the liquid with which it makes contact.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pressure sensor, comprising:
   a ceramic support;
   a first ceramic layer attached to a peripheral portion of one side of said ceramic support; and
   a second ceramic layer attached to a peripheral portion of another side of said ceramic support such that the pressure sensor is shaped as an integral assembly,
   wherein a hollow space is formed between said ceramic support and at least one of the first and second ceramic layers so that, after shaping as an integral assembly, the ceramic layer or layers will work as a diaphragm that is capable of deformation under pressure, and
   wherein said first ceramic layer is formed of a material which shrinks upon sintering by a factor that is no more than 4% different from the amount said ceramic support shrinks upon sintering.

2. The pressure sensor of claim 1, wherein the ratio of the thickness of said first ceramic layer to that of said second ceramic layer is in the range of 1:10 to 1:1.

3. The pressure sensor of claim 2, wherein said first ceramic layer is on a pressure detection side of said ceramic support and is made of a ceramic green sheet.

4. The pressure sensor according to claim 1, wherein the ratio of the thicknesses of the first and second ceramic layers to thickness of said ceramic support is no more than 1:2, respectively.

5. The pressure sensor of claim 4, wherein said first ceramic layer is on a pressure detection side of said ceramic support and is made of a ceramic green sheet.

6. The pressure sensor of claim 1, wherein said first ceramic layer is on a pressure detection side of said ceramic support and is made of a ceramic green sheet.

7. A pressure sensor, comprising:
   a ceramic support;
   a first ceramic layer attached to a peripheral portion of one side of said ceramic support; and
   a second ceramic layer attached to a peripheral portion of another side of said ceramic support such that the pressure sensor is shaped as an integral assembly,
   wherein hollow spaces are formed between said ceramic support and both of the first and second ceramic layers so that, after shaping as an integral assembly, the ceramic layers will both work as diaphragms that are capable of deformation under pressure.

8. The pressure sensor of claim 7, wherein the hollow spaces are formed between said ceramic support and both of the first and second ceramic layers by placing inserts between said ceramic support and both of the first and second ceramic layers, said inserts being formed of a material that sublimes upon heating and having a thickness not greater than that of the first and second ceramic layers.

9. The pressure sensor of claim 7, wherein the ratio of the thickness of said first ceramic layer to that of said second ceramic layer is in the range of 1:10 to 1:1.

10. The pressure sensor of claim 9, wherein the hollow spaces are formed between said ceramic support and both of the first and second ceramic layers by placing inserts between said ceramic support and both of the first and second ceramic layers, said inserts being formed of a material that sublimes upon heating and having a thickness not greater than that of the first and second ceramic layers.

11. The pressure sensor of claim 7, wherein the ratio of the thicknesses of the first and second ceramic layers to thickness of said ceramic support is no more than 1:2.

12. The pressure sensor of claim 11, wherein the hollow spaces are formed between said ceramic support and both of the first and second ceramic layers by placing inserts between said ceramic support and both of the first and second ceramic layers, said inserts being formed of a material that sublimes upon heating and having a thickness not greater than that of the first and second ceramic layers.

13. The pressure sensor of claim 7, wherein said first ceramic layer is on a pressure detection side of said ceramic support and is made of a ceramic green sheet.

14. The pressure sensor of claim 13, wherein said first ceramic layer is formed of a material which shrinks upon sintering by a factor that is no more than 4% different from the amount said ceramic support shrinks upon sintering.

* * * * *